United States Patent [19]

Collins

[11] 4,073,184

[45] Feb. 14, 1978

[54] SHAFT AXIAL POSITION MONITORING SYSTEM

[75] Inventor: David J. Collins, Salem, N.Y.

[73] Assignee: General Electric Company, Schenectady, N.Y.

[21] Appl. No.: 769,015

[22] Filed: Feb. 16, 1977

[51] Int. Cl.² .............................................. G01B 13/12
[52] U.S. Cl. ...................................... 73/37.6; 340/271
[58] Field of Search .......................... 73/37, 37.5, 37.6; 340/269, 271; 137/553, 557

[56] References Cited

U.S. PATENT DOCUMENTS

| 2,839,071 | 6/1958 | Rosch | 73/37.6 X |
| 3,220,244 | 11/1965 | Donnelly | 73/37.6 |
| 3,232,096 | 2/1966 | Bruijel | 73/37.6 |

FOREIGN PATENT DOCUMENTS

| 1,251,195 | 12/1960 | France | 73/37.5 |
| 1,160,652 | 1/1964 | Germany | 73/37.6 |
| 1,473,798 | 6/1969 | Germany | 73/37.5 |
| 1,915,947 | 10/1970 | Germany | 73/37 |
| 953,729 | 4/1964 | United Kingdom | 73/37.6 |

Primary Examiner—Richard C. Queisser
Assistant Examiner—Joseph W. Roskos
Attorney, Agent, or Firm—James W. Mitchell; John F. Ahern; Herbert E. Messenger

[57] ABSTRACT

A monitoring device is described which is particularly useful in tracking the axial displacement of a rotating shaft in either axial direction. The monitoring device includes a position monitoring function, an alarm and trip function, and a test function. Various fluidic devices are combined into a fluidic circuit for carrying out the foregoing functions in an improved, reliable and less costly manner than heretofore available in prior art devices. A distinct advantage of the invention is its relative ease of installation in retrofit applications.

8 Claims, 3 Drawing Figures

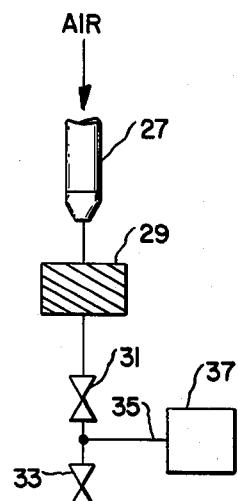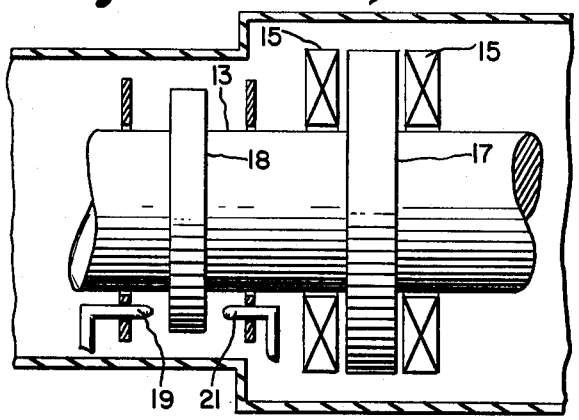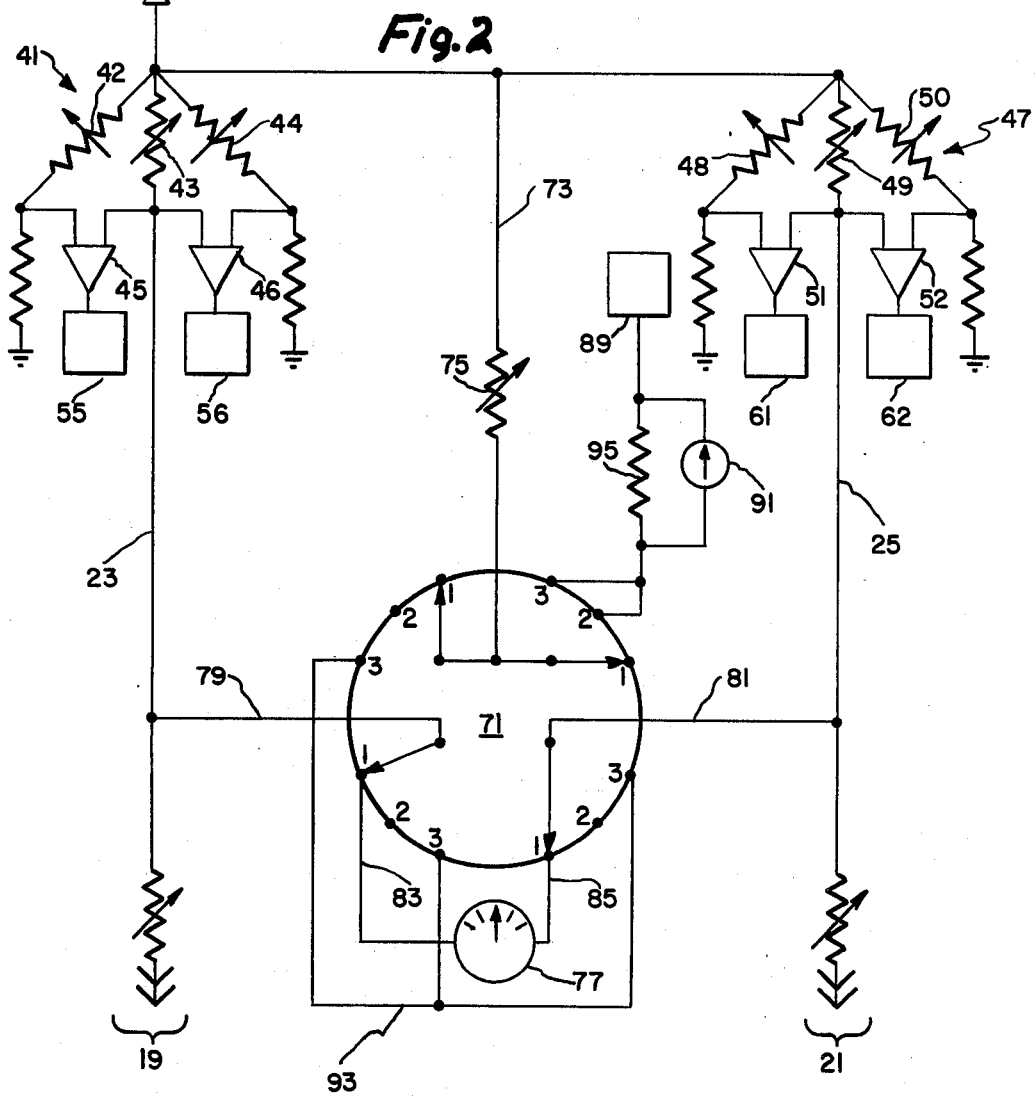
Fig. 1
Fig. 2

SHAFT AXIAL POSITION MONITORING SYSTEM

BACKGROUND OF THE INVENTION

This invention is directed, in general, to a monitoring device; and, in particular, this invention relates to a device for monitoring the axial displacement of a rotating shaft.

One example of an advantageous application of the present invention is within the environment of a large turbomachine such as a steam turbine. A steam turbine is a fluid driven machine comprised of a fluid tight casing having a rotating shaft (rotor) mounted therein. At either end of the casing the rotor is rotatably supported in a journal bearing. The rotor comprises a series of bladed rings which extend radially outward from the rotor in increasing diameters along the length of the rotor. Each blade ring is interposed between radially inwardly extending diaphragm rings which are stationary. Thus, a flow path through the casing is defined. For optimum efficiency, axial clearances between the rotating blade rings and the stationary diaphragm rings are expressed in mils and such clearances must be rigorously maintained. The axial position of the rotor is maintained in either direction by a thrust bearing in association with a thrust collar rotatable with the rotor. The interface between the thrust collar and the thrust bearing is comprised of an oil film.

Over an extended period of operation some wear of the thrust bearing will occur and permit some limited axial displacement of the rotor in either direction. It is important to note such axial displacement prior to the occurrence of real damage to the turbine parts previously mentioned so that routine maintenance procedures may be followed. In the event such axial displacement becomes excessive, then it may be desirable to automatically trip the turbine.

Prior art devices include U.S. Pat. No. 3,220,244 to Donnelly. In that patent, the preferred embodiment utilizes oil as a working fluid and includes a differential pressure gauge connected to an alarm or tripping device. The present invention differs in the manner in which the tripping and alarm circuits are implemented and moreover the present invention is fully testable. U.S. Pat. Nos. 2,888,023 and 3,861,818, both to Eggenberger show electrohydraulic devices which differ from the present invention both in construction and in the mode of operation and, which are not particularly suitable for retrofit applications.

BRIEF DESCRIPTION OF THE INVENTION

The invention comprises a fluidic source which supplies a pressurized fluid, preferably air, to a pair of nozzles located closely adjacent a measurement surface on the rotating shaft. The measurement surface may be an annular runner rotatable with the shaft whereas the nozzles have opposing discharge ends relative to the opposite runner surfaces. Interposed between each nozzle and the fluidic source is a pressure adjustable fluidic circuit including fluidic amplifiers for carrying out an alarm and trip function for each nozzle. A fluidic switch is also connected to the fluidic source for carrying out the test function. An axial position monitoring device may be included for monitoring the relative axial displacement of the rotating shaft.

It is an object of the invention to provide an axial position monitor for a rotating shaft which is reliable, fully testable and which may be easily retrofitted to a turbine apparatus.

It is another object of the invention to provide an axial position monitor for a rotating shaft which uses air as a working fluid.

It is a further object of the invention to provide an axial position monitor for a rotating shaft which is sensitive yet stable under all conditions of operation especially at alarm and trip points.

Other objects and advantages will become apparent from the following detailed description of the invention and the novel features will be particularly pointed out hereinafter in the claims.

BRIEF DESCRIPTION OF THE DRAWINGS

FIG. 1 is an outline drawing of the lower half of a turbomachine casing (plan view) and includes therein a rotating shaft portion having an annular runner rotatable with the shaft and showing one positioning arrangement of the fluidic nozzles.

FIG. 2 is a schematic diagram of a fluidic circuit used in combination with the nozzles according to a preferred embodiment of the invention.

DETAILED DESCRIPTION OF THE INVENTION

Figure 3:
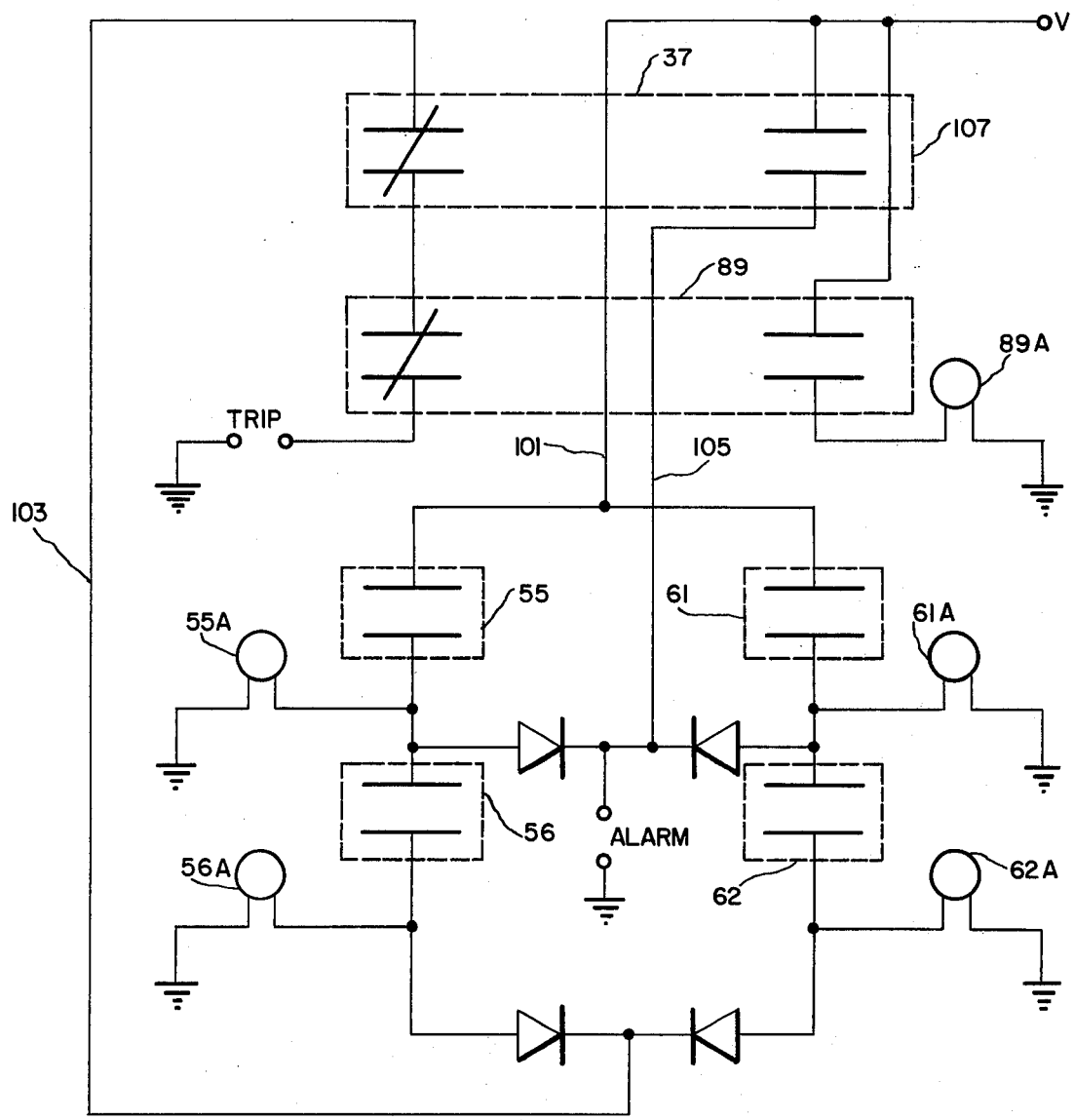
FIG. 3 is a schematic diagram of an electrical circuit used in combination with the nozzles and fluidic circuit according to a preferred embodiment of the invention.

As is illustrated in FIG. 1, a turbomachine casing 11 (shown in partial outline) may enclose a rotating shaft 13 which may be rotatably supported in a conventional manner by journal bearings (not shown). The rotating shaft may also include a plurality of bladed rings which extend outwardly from the rotating shaft in the radial direction interposed between stationary nozzle rings which extend radially inwardly from the machine casing toward the rotating shaft heretofore discussed and also well known in the turbomachine art and therefore not shown in the drawing. The rotating shaft may be restrained in the axial direction by a pair of thrust bearings 15 which inhibit the axial movement of the shaft in either direction. The thrust bearings are stationary and positioned on either side of a thrust collar 17 which is attached to and rotatable with the rotating shaft. The interface between the thrust collar and the thrust bearings is known to include a lubricating and hydrodynamic film.

Also attached to the rotating shaft is an annular runner 18 which is rotatable with the rotating shaft. A pair of nozzles 19 and 21 respectively, are positioned adjacent the rotating shaft and have their discharge ends oriented in opposite directions. In a preferred embodiment, the nozzles are air ejectors which have their discharge ends respectively pointed to opposite surfaces of the annular runner. Alternatively, the annular runner circumference could be formed as a vee shaped notch with the nozzles 19 and 21 having their respective discharge ends normal to opposite surfaces of the vee shaped notches. As both nozzles discharge a fluid against opposite surfaces on the annular runner and as the runner moves in either axial direction, an increased back pressure will be caused in one or the other of the nozzles, depending upon which direction the runner moves, due to the increased flow restriction between the runner surface and the nozzle discharge end. The increased restriction between a particular runner surface and a particular nozzle discharge end causes the increased back pressure in the nozzle which is input into a fluidic circuit yet to be described. It should be noted that application of the nozzles to the turbomachine casing will require minimal modification to the casing and in particular to the environment surrounding the annular runner. The use of air as a working fluid obviates the problem of having to drain the working fluid from the turbomachine casing.

A fluidic circuit is shown in FIG. 2, having lines 23 and 25 connectable to fluidic nozzles 19 and 21, respectively. A pressurized fluid, preferably air, is input into the fluidic circuit through pipe connection 27 and filter 29. The filtered air supply is input into a first pressure regulator 31 and a second pressure regulator 33. A test line 35 is connected, at one end, between the two pressure regulators; and, connected at its other end to a test pressure switch 37. Pressure switch 37 is normally pressurized and if the air supply pressure falls below a preset limit, switch 37 will change state to enable a low pressure alarm and open circuit a trip circuit yet to be described.

The output air supply from pressure regulator 33 is input into a pair of identical fluidic flow divider circuits 41 and 47. The flow divider circuits are available from the General Electric Company under the name Qualigard TM (Model CR280YM31A). Each flow divider circuit comprises three flow branches, each branch including a variably adjustable orifice. For example, flow divider circuit 41 includes adjustable orifices 42, 43 and 44. Flow divider circuit 41 also includes suitable vents indicated as ground connections. Orifice 42 provides a first adjustable pressure input to a fluidic alarm amplifier 45, whereas orifice 44 provides a first adjustable pressure input to a fluidic trip amplifier 46. Orifice 43 provides an adjustable air pressure to nozzle 19 through line 23 while also providing second pressure inputs to alarm and trip amplifiers 45 and 46, respectively. The alarm and trip amplifiers are bi-stable fluidic amplifiers which will change state whenever the second pressure input to the amplifier exceeds the first pressure input.

Likewise, flow divider circuit 47 includes adjustable orifices 48, 49 and 50. Flow divider circuit 47 includes suitable air vents indicated as ground connections. Orifice 48 provides a first adjustable pressure input to a fluidic alarm amplifier 51, whereas orifice 50 provides a first adjustable pressure input to a fluidic trip amplifier 52. Orifice 49 provides an adjustable air pressure to nozzle 21 through line 25 while also providing second pressure inputs to alarm and trip amplifiers 51 and 52 respectively. The alarm and trip amplifiers are bi-stable amplifiers which will change state whenever the second pressure input to the amplifier exceeds the first pressure input. Each alarm amplifier is preset to a lower pressure than its corresponding trip amplifier by suitable adjustment of the respective orifices associated therewith whereby the alarm amplifier will change state to provide an alarm signal prior to the occurrence of a trip signal.

Each amplifier is connected to a pressure switch. Amplifier 45 is connected to pressure switch 55; amplifier 46 is connected to pressure switch 56; amplifier 51 is connected to pressure switch 61; and, amplifier 52 is connected to pressure switch 62. Each amplifier is designed to provide an output pressure under normal operation and to cut-off said output pressure when it changes state so that its corresponding switch will close contact.

In addition to the first and second flow divider circuits, the pressurized air output from pressure regulator 33 is also input into a fluidic selector switch 71 through line 73 having a variably adjustable orifice 75. The fluidic selector switch is a three position (1, 2, 3), four pole switch (indicated by the pointer arrows shown). Each pointer arrow provides a fluidic connection to the switch position to which it points. In position 1, each nozzle is connected to a shaft axial position indicator 77. The indicator 77 includes a readout portion which indicates the axial position of the rotating shaft based upon the pressure differential between nozzles 19 and 21 taken through first and second conduits 79 and 81 connected to the appropriate pointer arrows of the selector switch respectively; and, lines 83 and 85 from the selector switch respectively. The indicator 77 is a differential pressure gauge which may be calibrated to readout shaft axial position. In position 1, the air supply through line 73 is blanked.

In position 2, the shaft axial position indicator 77 is disconnected from the fluidic switch; and, the air supply is connected to pressure switch 89 through a one way valve, 91. Pressure switch 89 is a lockout switch which disconnects the trip circuit in a manner to be explained with reference to FIG. 3.

In switch position 3, a test position, the pointers will connect pressure supply line 73 with lockout pressure switch 89 to maintain the lockout circuit. In addition, line 93 is pressurized to increase the pressure in lines 79, 23 and 81, 25 respectively and hence apply alarm and trip pressure for testing the alarm and trip components through each flow divider circuit.

FIG. 3 is an electrical diagram to be taken in conjunction with the description of FIG. 2. All switches are air operated pressure switches. All contacts are shown in their normally operative state whereas V indicates a voltage source.

In the normal operating mode, switches 55, 56, 61 and 62 are all held open by air pressure from amplifiers 45, 46, 51 and 52 respectively. If an increase in back pressure occurs in line 23 connected to nozzle 19, and the increase is above the setpoint of amplifier 45, then that amplifier will change state and cut-off thereby allowing contacts in switch 55 to close. This completes the electrical circuit from voltage source V along line 101 to indicator lamp 55A and to the alarm contacts. A further increase in back pressure in line 23 above the setpoint of amplifier 46 will cause switch 56 to close and light indicator 56A with a completion of the electrical circuit to the trip contacts. Likewise, switch 61 is connected to alarm and light 61A whereas switch 62 is connected to trip and light 62A.

Under conditions of low air pressure supply, switch 37 will change state to open circuit line 103, to the trip contacts, while close circuiting line 105 to the alarm contacts.

Switch 89 is the lockout switch. Whenever fluidic switch 71 is in either position 2 or 3, lockout switch 89 is pressurized to change state and open circuit line 103 to the trip contacts while closing the line 107 to an indicator lamp 89A. In FIG. 2, a restricted orifice 95 interposes a time delay with respect to switch 89 returning to its normal state as shown in FIG. 2. This ensures that in returning from a test position 3 to a normal run position 1, the switches 55, 56, 61 and 62 will all have been pressurized to an open position prior to reinstating the trip circuit so that the possibility of a false trip is averted. The operation of the shaft monitoring system is as follows.

Nozzles 19 and 21 are located in a turbomachine casing so that their respective discharge ends are closely adjacent the opposite faces of an annular runner attached to a rotating shaft. The nozzles are approximately normal to the annular runner so that axial movement of the rotating shaft in either direction will close a gap between one surface of the runner and a corresponding nozzle discharge end resulting in an increased back pressure in the one nozzle.

The nozzles are each connected to a fluidic circuit through separate flow divider circuits each of which has an alarm and trip device connected thereto. The alarm and trip devices each include amplifiers in circuit and each device has a separately adjustable setpoint for the alarm and trip points respectively. The flow divider circuits isolate the alarm and trip devices from input pressure fluctuations by means of adjustable pressure orifices thereby contributing to enhanced stability whereas, the sensitivity of the system is increased by the amplifier devices without resort to increased fluidic pressures. If the rotating shaft moves axially, a back pressure increase will occur in one or the other nozzles until amplifier setpoints are reached which will cause an alarm or trip.

The fluidic circuit moreover includes a selector switch which sets the mode of operation in either a run position, a lockout position or a test position. In the run position, the nozzles may also be connected to a shaft axial position monitor which tracks the shaft axial position. In the lockout position, the shaft axial position monitor and the trip circuit are disabled. In the test position, all system trip and alarm components are fully testable on line.

While there has been shown what is considered to be the preferred embodiment of the invention, it is, of course, understood that various other modifications may be made therein by those skilled in the art. It is intended to cover, in the appended claims, all such modifications which fall within the true spirit and scope of the invention.

What is claimed is:

1. A monitoring system for tracking the axial movement of a rotating shaft, said shaft including an annular runner rotatable with said shaft; and, said monitoring system comprising:
   a pair of fluidic nozzles, each nozzle having a discharge end closely adjacent an opposite surface of said shaft runner;
   a pressurized air supply to be delivered to each of said fluidic nozzles;
   a first flow divider circuit in combination with said air supply and one of said fluidic nozzles;
   a second flow divider circuit in combination with said air supply and the other of said fluidic nozzles; and,
   each flow divider circuit including three pressure adjustable branches; a first branch providing a setpoint for an alarm amplifier; a second branch providing a setpoint for a trip amplifier; and, a third branch connected to one or the other of said fluidic nozzles and to said alarm and trip amplifiers whereby pressurized air is supplied in parallel at separately adjustable pressures to each of said alarm and trip amplifiers and to each of said fluidic nozzles.

2. The monitoring system recited in claim 1 further comprising:
   a fluidic selector switch having selectable run, lockout and test positions, said selector switch connected in parallel with said flow divider circuits to said pressurized air supply;
   a first conduit interconnecting said selector switch with one nozzle and said first flow divider circuit; and,
   a second conduit interconnecting said selector switch with the other nozzle and said second flow divider circuit whereby in said test position back pressure to said flow divider circuits is increased.

3. The monitoring system recited in claim 1 further comprising:
   a fluidic selector switch having selectable run, lockout and test positions, said selector switch connected in parallel with said flow divider circuits to said pressurized air supply;
   a first conduit interconnecting said selector switch with one nozzle and said first flow divider circuit; and,
   a second conduit interconnecting said selector switch with the other nozzle and said second flow divider circuit; and,
   a shaft axial position monitor connected to said first and second conduits through said selector switch in the run position whereby the shaft axial position relative to said nozzles is determined by the difference in back pressure between said nozzles.

4. A monitoring system for tracking the axial movement of a rotating shaft, said shaft including an annular runner rotatable with said shaft; and said monitoring system comprising:
   a pair of fluidic nozzles, each nozzle having a discharge end closely adjacent an opposite surface of said shaft runner;
   a pressurized fluid supply;
   a fluidic circuit including a pair of flow divider circuits connected in parallel between the pressurized fluid source and one or the other of said fluidic nozzles; each flow divider circuit having an alarm amplifier and a trip amplifier connected thereto; a fluidic selector switch connected to said pressurized fluid supply and having at least one test position interconnecting each flow divider circuit and its associated nozzle with the pressurized fluid supply through said selector switch; and,
   an electrical circuit including a pressure switch connected to each alarm amplifier and each trip amplifier, and warning lamps connected to each pressure switch, whereby the warning lamps may be actuated through the flow divider circuits by axial movement of the rotating shaft or by selective adjustment of the selector switch.

5. A monitoring system for tracking the axial movement of a rotating shaft, said shaft including an annular runner rotatable with said shaft; and, said monitoring system comprising:
   a pair of fluidic nozzles, each nozzle having a discharge end closely adjacent an opposite surface of said shaft runner;
   a pressurized fluid supply;
   a flow divider circuit connected to each nozzle and the pressurized fluid supply; each flow divider circuit including separately adjustable alarm and trip amplifiers connected in parallel to said pressurized fluid supply and said nozzle whereby an increase in back pressure from said nozzle may cause the alarm and/or trip amplifier to change state;

a first pressure switch connected to the alarm amplifier and a second pressure switch connected to the trip amplifier of each flow divider circuit, whereby as an amplifier changes state an alarm or trip circuit is completed.

6. The monitoring system recited in claim 5 further comprising:
a shaft axial position monitor;
a lockout switch; and,
a fluidic selector switch connected to said pressurized fluid supply having three selectable positions; a run position interconnecting each nozzle with said shaft axial position monitor; a lockout position interconnecting the pressurized fluid supply with said lockout switch; and, a test position interconnecting the pressurized fluid supply with said lockout switch and each flow divider circuit.

7. The monitoring system recited in claim 6 further comprising a low pressure switch connected between said pressurized fluid supply and said flow divider circuits.

8. The monitoring system recited in claim 7 further comprising indicator lamps in combination with an electrical circuit; said electrical circuit including a plurality of electrical contacts the status, of each, being determined by the pressure actuated amplifier switches, lockout switch or the low pressure switch.

* * * * *